Patented July 4, 1933

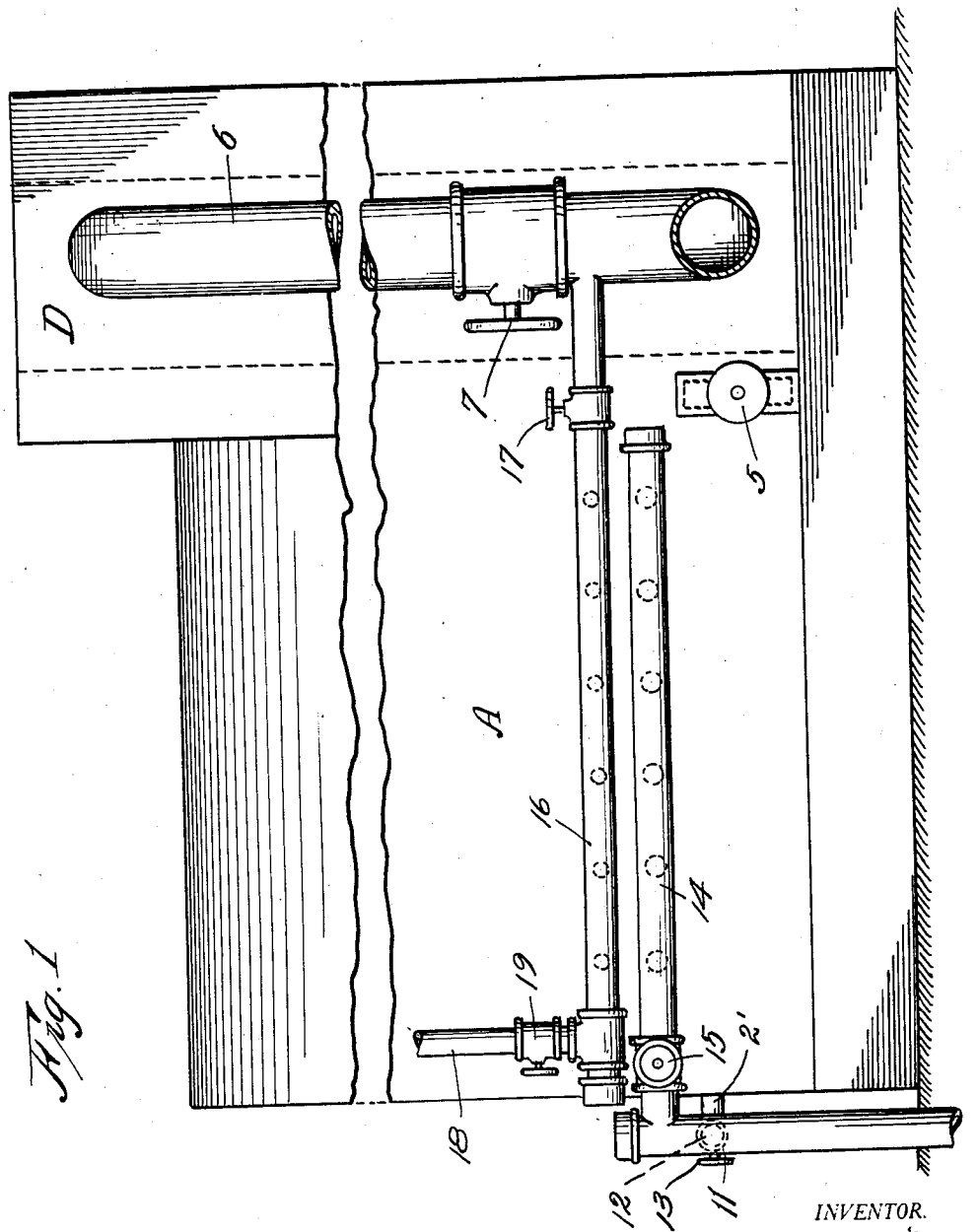

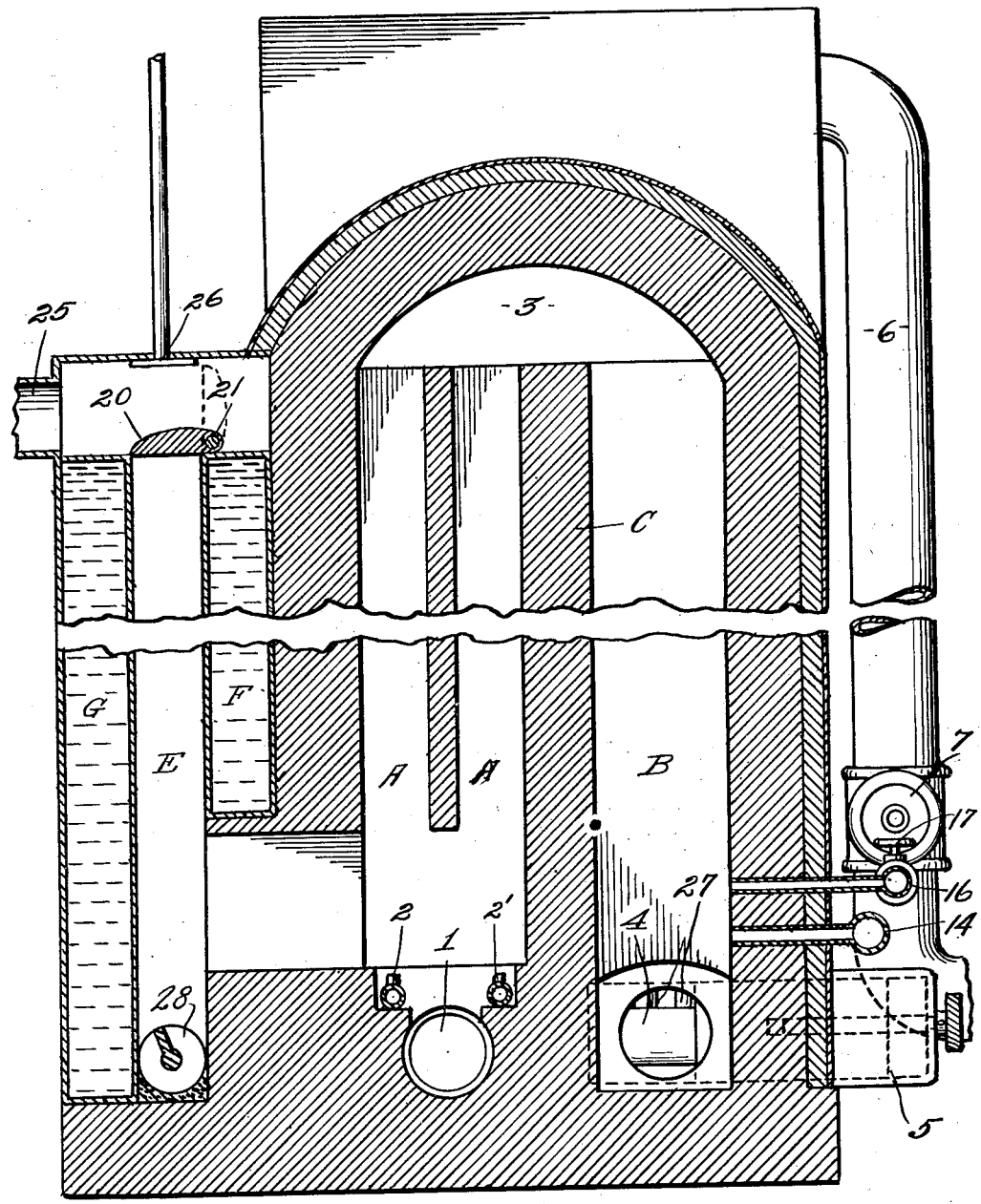

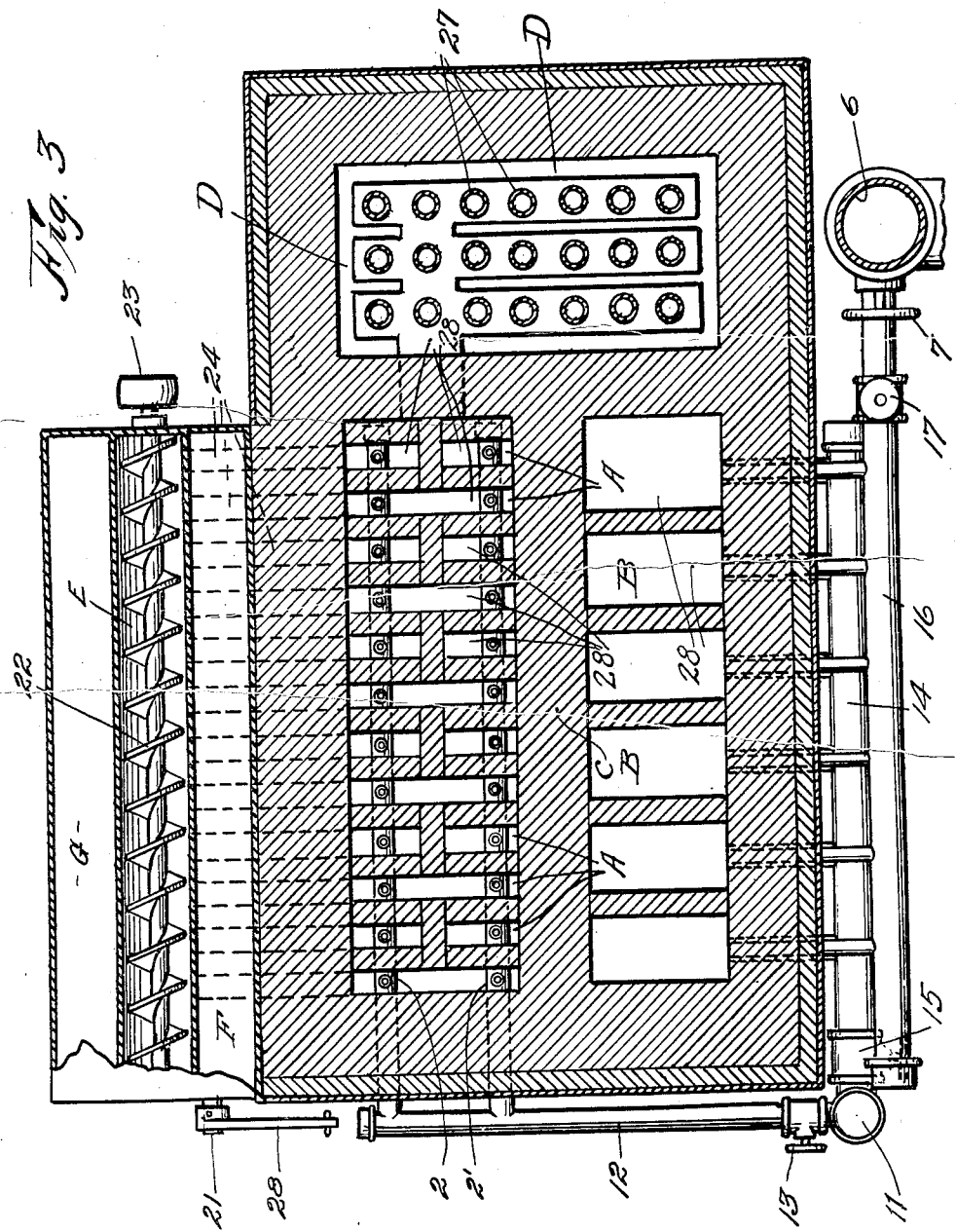

1,916,545

UNITED STATES PATENT OFFICE

WILLIAM D. WILCOX, OF LAWRENCE, KANSAS

APPARATUS FOR THE THERMAL DISSOCIATION OF HYDROCARBON GASES AND VAPORS

Application filed April 12, 1930. Serial No. 443,903.

It has been known for a considerable period of time that where hydrocarbon gases and vapors are subjected to a high temperature and/or brought in contact with highly heated surfaces which exercise a catalytic effect, they may be broken down more or less completely into carbon and hydrogen according to the formulas $CH_4 + $ heat equals $C + 2H_2$, $C_2H_6 + $ heat equals $2C + 3H_2$ etc.

These reactions find a place in a number of patents directed toward the recovery of carbon and/or hydrogen and are also employed in the production of fuel gas. In some the hydrocarbon gases are passed through coke heated to incandescence by precedent blasting. In others, irregularly placed refractory material is used as the medium of heat transfer and contact action.

In a considerable group hydrocarbon gases are passed through an externally heated retort or in contact with electrodes brought to a high temperature by the passage of an electric current. Mechanical means are provided for removing the carbon from the heated surfaces. Checker brick is employed in a majority of those which have come into commercial use. These are heated by the combustion of fuel in a cyclic procedure.

While my apparatus may be used to produce a mixture of oxides of carbon and hydrogen by adding steam or oxygen to the hydrocarbon gases before subjecting them to heat or to obtain a mixture of oxides of carbon nitrogen and hydrogen by adding to the hydrocarbon gases a volume of air substantially less than that needed for complete combustion, with or without steam, it is particularly designed for the production of carbon in the finely divided form generally known as carbon black, with a residue gas largely hydrogen, with or without admixtures of nitrogen and oxides of carbon.

I have found it impractical to remove the deposited carbon by mechanical means from a zone heated to temperatures at which a substantial dissociation takes place. Only so much of the carbon as is carried from the heated zone by the current of gas may be readily conserved as such. I have also found that coke or irregularly placed refractories retain most of the carbon and that this is true in a less degree when checker brick is employed.

The carbon particles are subject to the laws of gravity, they may settle on horizontal surfaces, and there is a pronounced tendency for the particles to adhere to the surfaces with which they come in contact. As is quite clear, merely upon consideration, there is in any body of checker brick a considerable area of horizontal surfaces, for the most part outside the line of travel of the gas. The carbon collects more readily upon these surfaces.

In my construction I seek to eliminate horizontal surfaces, and to make possible operation of the apparatus with a much higher velocity of passage through the heated chambers without reducing the time of contact of the gas with hot surfaces or radiated heat. This can be done only by increasing the length of travel beyond what has been provided in the past. The construction of the apparatus can be more readily understood by reference to the drawings which accompany and form a part of these specifications. Figure 1 shows a front elevation. Figure 2, a vertical cross section. Figure 3, a horizontal cross section with a small corner not cut. The apparatus consists essentially of three vertical chambers A, B, and D, with their accessories. A may be described as the dissociation chamber; B as a preheating chamber; D as a heat exchange. These chambers in the drawings are shown enclosed in a common casing of refractory brick, an outer layer of insulating material and a steel jacket, but may be enclosed in independent casings without any departure from the essential features of the design. A and B in Figure 2 are separated by a dividing wall C, with a cross connection 3 at the top. B and D are connected at their base by a passage 4 closed by valve 5. An air supply pipe, 1, discharges air from a system of pipes 27, enclosed in D, into the base of A. The various working parts will be referred to as operation is described.

*Heating up.*—Valve 20, Figure 2 being closed, valve 5 and valve 7 opened; air is passed under pressure up through pipe 6 into the system of pipes (27), enclosed in D, and through 1 into A. Combustible gas is introduced into manifold pipes 2—2' by opening valve 13 on pipe 12. As shown in drawings the fuel gas is drawn from the same source as the hydrocarbons submitted to treatment, but I may elect to employ some other source of fuel gas and to modify construction so far as may be necessary to do this. The gas being ignited, the flames pass up through the vertical flues 28 of refractory material in A, best shown in Figure 3, pass through 3 into the upper part of B, thence downward and into D, through 4; up D in contact with pipes 27 and to the air. The hot combustion gases impart heat to the surfaces in A, in a less degree, to the surfaces in B, and to the air passing down through pipes 27—27, and through 1, into the base of A.

The temperature requisite to dissociation having been attained in A, as may be ascertained by the use of a sight cock or thermocouple, the air is shut off by closing valve 7 on 6. Gas is permitted to enter through 2—2' for a length of time sufficient to displace the products of combustion in A and B. Valve 13 is now closed; valve 5 is closed; valve 20 opened. Valve 15 is opened, admitting hydrocarbon gases from 11 into manifold pipe 14, from which they pass into the base of B and being heated by contact with the walls of B, across through 3, down A, passing from the flues of A into E. They are cooled by contact with the walls of water-containing chambers F and G, and pass out through 25.

There is a substantial increase in the proportion of released carbon carried from the dissociation chamber by reason of the substitution of vertical flues in place of checker brick as the heat imparting media and by reason of the greater velocity of gas flow made possible with equivalent time of subjection to heat by increasing the height of the dissociation chamber. This greater height is suggested by the broken lines in Figures 1 and 2. While many vertical dissociation chambers appear in the drawings of prior patents issued and no limitations upon their height occurs in the specifications, the apparatus here designed will be constructed of substantially greater height than will as a fact be found in prior practice and this greater height contributes materially to the better results obtained. The carbon passing with the issuing gas from 25 may be removed from it by screens, by electric precipitation, by deposition in baffled chambers or other suitable means. The carbon remaining in A will be consumed during the subsequent reheating cycle.

Such carbon as may adhere to the walls of F and G may from time to time be forced down by scraper 26 (Figure 3) and removed by helical conveyor 23. There is a loss of heat both through the heat carried away by the hot gases issuing from A and by reason of the heat absorbed in effecting dissociation. After an interval to be determined by operating experience, valve 15, Figure 1, will be closed and the gaseous content of B and A driven forward into E either by admitting air into manifold 16 by opening valve 17, or by admitting steam through 18 by opening valve 19. Purging having been completed, reheating will be resumed.

The use of a hot air blast is long established procedure in the smelting of metals, but so far as I have been able to ascertain, the advantage gained by the use of preheated air in the thermal dissociation of hydrocarbons has not been realized by prior inventors, or made a feature of any existing procedure.

To secure an at all complete dissociation of so refractory a gas as methane within a commercially practicable period of time requires a very high temperature; a temperature in excess of what may readily be created by a combustion of hydrocarbon gases with air at atmospheric temperature.

By using air preheated to perhaps 600° F. I obtain a very considerable increase in the flame temperature of the blast gases and a much more rapid transfer of heat to the surfaces of the refractory flues, thus attaining the dissociation temperatures in a shorter time and permitting a larger portion of the total operating period to be devoted to actual production. To the extent that the heat exchange renders useful heat units otherwise wasted, the total fuel consumed in reheating is reduced.

What I claim as new and desire to protect by the issuance to me of Letters Patent, is:

1. In apparatus for the thermal dissociation of hydrocarbon gases and vapors, the combination of a dissociation chamber, vertical flues within the dissociation chamber, a preheating chamber, a cross connection at the upper extremity of these chambers, a heat exchange chamber, a valve controlled passage from the base of the preheating chamber into the heat exchange chamber, means of passing air through the heat exchange chamber into the base of the dissociation chamber.

2. In apparatus for the thermal dissociation of hydrocarbon gases and vapors, the combination of a vertical dissociation chamber, vertical flues of refractory material within the chamber, means of introducing air and combustible gas into the base of the chamber, means of withdrawing gas from the base of the chamber, a preheating chamber, a cross connection between the upper extremity of the dissociation chamber and the upper extremity of the preheating chamber, valve controlled means of withdrawing combustion gases from the lower extremity of the preheating chamber, means of introducing hydrocarbon gases into the lower extremity of the preheating chamber.

3. In apparatus for the thermal dissociation of hydrocarbon gases and vapors, the combination of a vertical dissociation chamber, means of introducing combustible gas into the lower extremity of the dissociation chamber, a connected preheating chamber, a heat exchange chamber, a closeable passage from the preheating chamber into the heat exchange, means of passing air through the heat exchange into the base of the dissociation chamber, means of introducing hydrocarbon gases into the lower extremity of the preheating chamber and withdrawing them from the lower extremity of the dissociation chamber.

4. In apparatus for the thermal dissociation of hydrocarbon gases and vapors, the combination of a vertical dissociation chamber, a filling of vertical flues having refractory walls within the dissociation chamber, means of introducing combustible gas and air into the lower extremity of the dissociation chamber and of discharging gases therefrom, a vertical preheating chamber, a filling of vertical flues having refractory walls within the preheating chamber, a cross connection joining the upper extremity of the dissociation chamber and the upper extremity of the preheating chamber, means of introducing gaseous mixtures into the lower extremity of the preheating chamber and of discharging combustion gases therefrom, means of cooling the gases issuing from the lower extremity of the dissociation chamber.

5. In apparatus for the thermal dissociation of hydrocarbon gases and vapors, the combination of a vertical dissociation chamber, filled with a multiplicity of vertical refractory walled flues, means for introducing combustible gas and air into the lower extremity of the dissociation chamber, and for discharging gases therefrom, a vertical preheating chamber filled with a multiplicity of vertical refractory walled flues, a cross connection between the upper extremities of the dissociation chamber and the preheating chamber, means for introducing hydrocarbon gases into the lower extremity of the preheating chamber and for discharging combustion gases therefrom.

6. In apparatus for the thermal dissociation of hydrocarbon gases and vapors, the combination of a vertical dissociation chamber filled with a multiplicity of vertical refractory walled flues, means for introducing combustible gas and air into the lower extremity of the dissociation chamber and for discharging gases therefrom, a vertical preheating chamber filled with a multiplicity of vertical refractory walled flues, a cross connection joining the upper extremities of the dissociation chamber and the preheating chamber, means for admitting hydrocarbon gases and air to the lower extremity of the preheating chamber and for discharging combustible gases therefrom.

7. In apparatus for the thermal dissociation of hydrocarbon gases and vapors, the combination of a vertical dissociation chamber filled with a multiplicity of vertical refractory walled flues, means for introducing combustible gas and air into the lower extremity of the dissociation chamber and for discharging gases therefrom, a vertical preheating chamber filled with a multiplicity of vertical refractory walled flues, a cross connection joining the upper extremities of the dissociation chamber and the preheating chamber, means for admitting hydrocarbon gases and steam to the lower extremity of the preheating chamber and for discharging combustion gases therefrom.

8. In apparatus for the thermal dissociation of hydrocarbon gases and vapors, the combination of a vertical dissociation chamber filled with a multiplicity of vertical refractory walled flues, means for introducing combustible gas and air into the lower extremity of the dissociation chamber and for discharging gases therefrom, a vertical preheating chamber filled with a multiplicity of vertical refractory walled flues, a cross connection joining the upper extremity of the dissociation chamber and the upper extremity of the preheating chamber, means for admitting gaseous mixtures to the lower extremity of the preheating chamber, a heat exchange, means for passing combustion gases from the preheating chamber through the heat exchange, and means for passing air through the heat exchange to the lower extremity of the dissociation chamber.

9. In apparatus for thermal dissociation of hydrocarbon gases and vapors, the combination of a refractory walled vertical dissociation chamber, means for introducing combustible gas and air into the lower extremity of the dissociation chamber and means for discharging gases therefrom, a vertical refractory walled preheating chamber, a cross connection joining the upper extremities of the dissociation chamber and the preheating chamber, means for admitting gaseous mixtures to the lower extremity of the preheating chamber, a heat exchange, means for passing combustion gases from the lower extremity of the preheating chamber through the heat exchange, means for passing air through the heat exchange into the lower extremity of the dissociation chamber.

10. In apparatus for the production of carbon black by contact of hydrocarbon gases with refractory surfaces brought to a dissociating temperature by precedent combustion within an enclosing chamber, the improvement which consists of placing a multiplicity of vertical refractory walled flues within the chamber.

11. The improvement in apparatus for the production of carbon black and hydrogen through the dissociation of hydrocarbon gases and vapors effected by their passage through an enclosing chamber heated to a dissociating temperature by a precedent internal combustion within the chamber, which consists in filling the enclosing chamber with a multiplicity of refractory walled flues through which the combustion gases and the gases to be dissociated are successively passed.

12. The improvement in apparatus for the production of carbon black and hydrogen through the dissociation of hydrocarbon gases and vapors effected by their passage through an enclosing chamber heated to a dissociating temperature by a precedent combustion within the chamber, which consists in placing within the chamber refractory heat absorbing masses, all the surfaces of which that are in contact with the gases passing through the chamber are substantially parallel with the general direction of gas flow through the chamber.

In witness whereof I affix my signature.

WILLIAM D WILCOX.